O. SALISBURY.
NUT LOCK.
APPLICATION FILED JAN. 22, 1910.
976,928.
Patented Nov. 29, 1910.
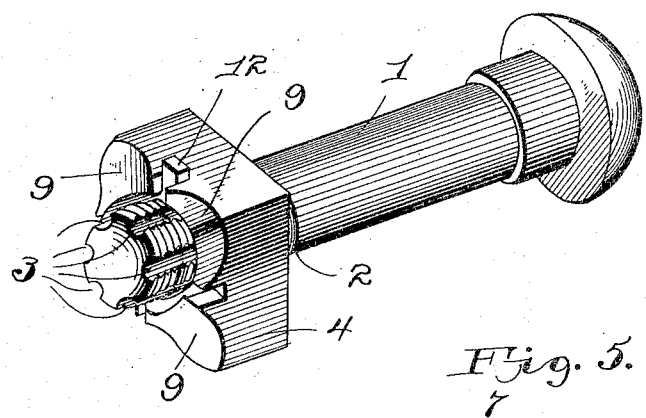
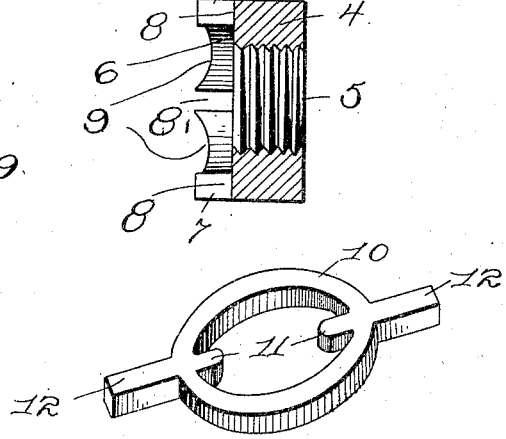
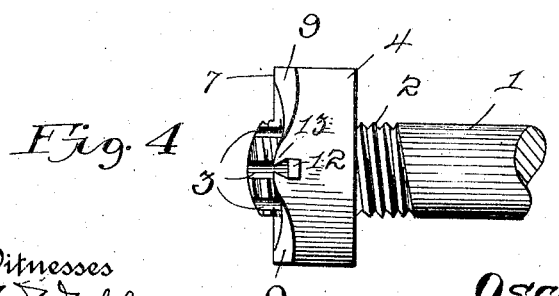
Witnesses
Inventor
Oscar Salisbury.
By E. E. Crosman
his Attorney

UNITED STATES PATENT OFFICE.

OSCAR SALISBURY, OF BASSANO, ALBERTA, CANADA.

NUT-LOCK.

976,928.  Specification of Letters Patent.  Patented Nov. 29, 1910.

Application filed January 22, 1910. Serial No. 539,479.

*To all whom it may concern:*

Be it known that I, OSCAR SALISBURY, a subject of the King of England, residing at Bassano, in the Province of Alberta and Dominion of Canada, have invented certain new and useful Improvements in Nut-Locks, of which the following is a specification, reference being had therein to the accompanying drawing.

This invention relates to nut locks and blocks, and the principal object of the same is to provide means which will normally retain the bolt and nut in locked relation, but which may be readily removed from its locking position when it is desired or necessary to remove the nut from the bolt.

In the practical application of the invention it is contemplated employing a longitudinally-slotted bolt, a counterbored nut provided with notched walls and cam surfaces, and a locking washer provided with lugs for engagement with the slots of the bolt and arms for engagement with the notches of the nut, the same surfaces of the nut being adapted to serve as guides to move the said washer so that its locking arms and lugs may be automatically dropped into locking engagement with said slots and notches.

In carrying out the objects of the invention generally stated above, it will be understood, of course, that the essential features thereof are necessarily susceptible of changes in detail and structural arrangements, one preferred and practical embodiment of which is shown in the accompanying drawing, wherein:

Figure 1 is a perspective view of the improved nut and bolt lock. Fig. 2 is an end view. Fig. 3 is a detail perspective view of the locking washer. Fig. 4 is a side elevation of a nut and bolt held in locked relation and showing the manner of retaining the locking washer in engagement with the nut. Fig. 5 is a central sectional view of the nut forming a part of this invention.

Referring to said drawing by numerals, 1 designates a bolt, the threaded portion 2 of which is provided with a plurality of regularly spaced external longitudinally-arranged grooves 3.

The nut 4 is provided with the usual threaded opening 5 which is surrounded on one face of the nut by a counterbored portion 6, the outstanding side walls 7 of which are provided with locking notches or recesses 8. The nut, as shown, may be a four-sided nut, the outstanding walls 7 of the nut being a continuation of said sides and each wall being provided with one notch or recess, the arrangement of the notches being such that they radiate from the center of the nut. The outer edge of the four corners of the side walls 7 is concaved and downwardly inclined as indicated at 9, the concaved portion of each corner extending to the notches 8 adjacent said corners.

A flat circular washer 10 of a diameter to fit over the threaded portion of the bolt 1 and be seated within the counterbored portion 6 of the nut, is provided with oppositely-disposed inwardly-projecting lugs 11 adapted to be engaged with the grooves 3 of the bolt, and also with oppositely disposed outwardly projecting locking arms 12 which are adapted for engagement with the notches 8 of the walls 7 of the nut 4.

As will be observed by reference to Fig. 4, the locking arms 12 may be fastened within the notches 8 of the walls 7 by upsetting the material of the walls at the open end of said notches 8, as is indicated by the numeral 13.

It will be seen from the foregoing that the counterbored portion of the nut is provided with an inclosed seat for the washer so that there is no danger of the washer being jarred to a nut and bolt releasing position.

In assembling the improved nut and bolt lock, the nut is screwed onto the bolt in the usual manner after which the washer is placed over the bolt with its lugs 11 in engagement with some of the grooves of the bolt. In the event of the notches of the nut not being in the position to receive the arms 12, said arms will rest on the concaved inclined portion 9 of the walls 7, which portions act as guides for directing the arms to the said notches as the nut is rotated.

To release the nut from the bolt, the upset material at the end of the notches may be straightened out by an ordinary prying tool, after which the washer may be removed from its locking position within the counterbored portion of the nut.

What I claim is:

1. A device of the character described comprising a slotted bolt, a nut for said bolt, said nut being counterbored to form a seat, the outer end of said nut provided with concave portions forming guides and being provided with slots between said guide portions, and a locking washer adapted to fit within said seat and provided with tongues to fit within the slots in said bolt and nut.

2. A device of the character described comprising a longitudinally-slotted bolt, a nut on said bolt, the outer surface of said nut being counter-sunk to form a seat, the walls of said seat provided with radial slots, a locking washer adapted to fit within said seat, said washer being formed of a circular body-portion provided with outwardly and inwardly-projecting lugs, said lugs being in alinement with each other and adapted, respectively, for engagement with the slots of the bolt and the slots of the nut.

3. A device of the character described comprising a longitudinally-slotted bolt, a nut on said bolt, said nut being counter-sunk to form a seat, the outer wall of said seat being provided with concave portions and radial slots between said concave portions, a washer fitting within said seat, said washer being provided with outwardly and inwardly-projecting lugs to fit within the slots in said nut and bolt, the walls of said radial slots adapted to be upset to lock said washer in place.

In testimony whereof I hereunto affix my signature in presence of two witnesses.

OSCAR SALISBURY.

Witnesses:
J. WEMYSS RENTON,
E. S. HOTCHKISS.